(12) United States Patent
Nakamura et al.

(10) Patent No.: US 11,108,289 B2
(45) Date of Patent: Aug. 31, 2021

(54) ROTOR AND MOTOR

(71) Applicant: Mitsubishi Electric Corporation, Tokyo (JP)

(72) Inventors: Yuichiro Nakamura, Tokyo (JP); Koji Shimomura, Tokyo (JP); Yu Hirotani, Tokyo (JP); Kenta Setaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/733,896

(22) PCT Filed: Jun. 6, 2018

(86) PCT No.: PCT/JP2018/021771
§ 371 (c)(1),
(2) Date: Dec. 1, 2020

(87) PCT Pub. No.: WO2019/234866
PCT Pub. Date: Dec. 12, 2019

(65) Prior Publication Data
US 2021/0226491 A1    Jul. 22, 2021

(51) Int. Cl.
*H02K 1/27* (2006.01)
*H02K 29/03* (2006.01)
*H02K 1/14* (2006.01)

(52) U.S. Cl.
CPC ............... *H02K 1/278* (2013.01); *H02K 1/14* (2013.01); *H02K 29/03* (2013.01); *H02K 2201/03* (2013.01); *H02K 2213/03* (2013.01)

(58) Field of Classification Search
CPC .......... H02K 1/278; H02K 1/14; H02K 29/03; H02K 2201/03; H02K 2213/03
(Continued)

(56) References Cited

U.S. PATENT DOCUMENTS

| | | | |
|---|---|---|---|
| 8,796,897 B2* | 8/2014 | Taniguchi | H02K 1/2746 |
| | | | 310/156.54 |
| 2010/0301695 A1* | 12/2010 | Yamada | H02K 1/2746 |
| | | | 310/156.01 |

(Continued)

FOREIGN PATENT DOCUMENTS

| | | |
|---|---|---|
| CN | 101951046 A | 1/2011 |
| CN | 102035277 A | 4/2011 |

(Continued)

OTHER PUBLICATIONS

International Search Report and Written Opinion dated Aug. 7, 2018, received for PCT Application No. PCT/JP2018/021771, Filed on Jun. 6, 2018, 11 pages including English Translation.
(Continued)

*Primary Examiner* — Thomas Truong
(74) *Attorney, Agent, or Firm* — Xsensus LLP (57) ABSTRACT

A rotor includes a rotor core, first magnetic poles that respectively include a plurality of permanent magnets and have a first polarity provided by the permanent magnets, and second magnetic poles that are each formed between the permanent magnets adjacent to one another and are salient poles having a polarity different from the first polarity. $\theta im$ and $\theta is$ satisfy the relation $\theta im > \theta is$. $\theta om$ and $\theta os$ satisfy the relation $(\theta om \times 1.1) \geq \theta os \geq (\theta om \times 0.9)$. The rotor thus obtained can suppress increase in cogging torque while suppressing decrease in torque.

8 Claims, 5 Drawing Sheets

(58) Field of Classification Search
USPC .................................... 310/156.01–156.84
See application file for complete search history.

(56) References Cited

U.S. PATENT DOCUMENTS

2014/0246958 A1    9/2014    Taniguchi
2017/0373549 A1    12/2017    Takizawa et al.

FOREIGN PATENT DOCUMENTS

| | | |
|---|---|---|
| CN | 103872821 A | 6/2014 |
| CN | 105337433 A | 2/2016 |
| JP | 2014-124092 A | 7/2014 |
| JP | 2014-171320 A | 9/2014 |
| JP | 2015-204734 A | 11/2015 |
| WO | 2016/139719 A1 | 9/2016 |

OTHER PUBLICATIONS

Decision to Grant dated Jan. 22, 2019, received for Japanese Application No. 2018-566460, 5 pages including English Translation.

Office Action dated Jun. 1, 2021 in Chinese Patent Application No. 201880094150.X, 16 pages.

\* cited by examiner

ROTOR AND MOTOR

CROSS-REFERENCE TO RELATED APPLICATION

The present application is based on PCT filing PCT/JP2018/021771, filed Jun. 6, 2018, the entire contents of which are incorporated herein by reference.

FIELD

The present invention relates to a rotor including a rotor core and a plurality of permanent magnets provided to the rotor core and also relates to a motor including the rotor.

BACKGROUND

A consequent-pole rotor is such that: first magnetic poles, which are provided by permanent magnets; and second magnetic poles, which are not provided by permanent magnets but are salient poles of a rotor core; are arranged alternately along a circumferential direction on a periphery of the rotor core; and the first magnetic pole and the second magnetic pole have different inductances from each other. Therefore, an imbalance between the inductances problematically causes great torque ripple compared to when a rotor uses permanent magnets to have first and second magnetic poles. Patent Literature 1 discloses a technique for reducing torque ripple due to an inductance imbalance while suppressing decrease in torque. A rotor disclosed in Patent Literature 1 includes a rotor core and a plurality of permanent magnets provided to the rotor core. Magnet poles are provided by permanent magnets, and salient poles of the rotor core are not provided by permanent magnets. The magnet poles and the salient poles are arranged alternately along a circumferential direction on a periphery of the rotor core of the rotor. A first magnetic pole occupancy angle θ1 of the rotor disclosed in Patent Literature 1 is greater than a second magnetic pole occupancy angle θ2. With the occupancy angle θ1 being greater than the occupancy angle θ2, the inductance imbalance between the first magnetic pole and the second magnetic pole is decreased compared to when the occupancy angle θ1 is equal to the occupancy angle θ2, so that the torque ripple can be reduced while the decrease in torque is suppressed.

CITATION LIST

Patent Literature

Patent Literature 1: Japanese Patent Application Laid-open No. 2014-124092

SUMMARY

Technical Problem

However, because the rotor having the structure disclosed in Patent Literature 1 has the occupancy angle θ1 greater than the occupancy angle θ2, a first peripheral width of an outer peripheral surface of the first magnetic pole is greater than a second peripheral width of an outer peripheral surface of the second magnetic pole. This means that magnetic attraction between the first magnetic pole's outer peripheral surface and a stator is greater than magnetic attraction between the second magnetic pole's outer peripheral surface and the stator. Consequently, increased cogging torque is problematically caused when the rotor is rotated.

The present invention has been made in view of the above, and an object of the present invention is to obtain a rotor that can suppress increase in cogging torque while suppressing decrease in torque.

Solution to Problem

To solve the above problems and achieve the object a rotor according to the present invention includes: a rotor core; first magnetic poles disposed on a rotor core in spaced relation to one another in a circumferential direction along a periphery of the rotor core, each of the first magnetic poles including a permanent magnet and having a first polarity provided by the permanent magnets; and second magnetic poles formed in a circumferential direction spaced apart along the periphery in the rotor core, each of the second magnetic poles being between the permanent magnets that are adjacent to one another, the second magnetic poles being salient poles having a polarity different from the first polarity. Wherein a radial center of the rotor core is a center, a line connecting the center and a first edge of a radially outer side of each of the permanent magnets and a line connecting the center and a second edge of the radially outer side of each of the permanent magnets form an angle θom, a line connecting the center and a first edge of a radially inner side of each of the permanent magnets and a line connecting the center and a second edge of the radially inner side of each of the permanent magnets form an angle θim; a line connecting the center and a first edge of a radially outer side of each of the salient poles and a line connecting the center and a second edge of the radially outer side of each of the salient poles form an angle θos; a line connecting the center and a first edge of a radially inner side of each of the salient poles and a line connecting the center and second edge of the radially inner side of each of the salient poles form an angle θis; the angle θim and the angle θis satisfy the relation θim>θis; and the angle θom and the angle θos satisfy the relation (θom×1.1)≥θos.

Advantageous Effect of Invention

The rotor according to the present invention can suppress increase in cogging torque while suppressing decrease in torque.

DESCRIPTION OF EMBODIMENTS

With reference to the drawings, a detailed description is hereinafter provided of rotors and motors according to embodiments of the present invention. It is to be noted that these embodiments are not restrictive of the present invention.

First Embodiment

Figure 1:
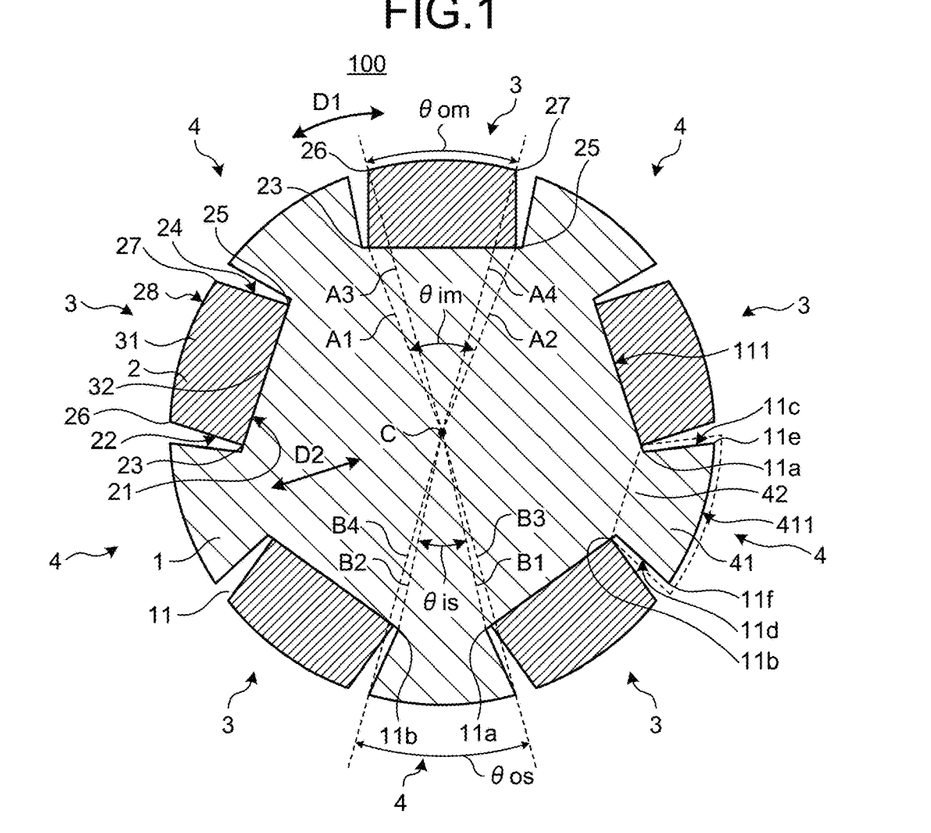
FIG. 1 is a cross-sectional view of a rotor according to a first embodiment of the present invention.

FIG. 1 is a cross-sectional view of a rotor according to the first embodiment of the present invention. The rotor 100 illustrated in FIG. 1 is a consequent-pole rotor. The rotor 100 includes a rotor core 1 and a plurality of permanent magnets 2. The rotor core 1 is a stack of a plurality of electrical steel sheets. Circumferential direction of the rotor core 1 is indicated by arrow D1. Radial direction of the rotor core 1 is indicated by arrow D2. The radial center of the rotor core 1 is indicated by C. The rotor core 1 is formed with a plurality of recesses 11. Each of the plurality of recesses 11 is a recess that is set back from a radially outer side of the rotor core 1 toward the center of the rotor core 1. Each of the plurality of permanent magnets 2 is disposed in each of the plurality of recesses 11. The permanent magnets 2 are, for example, rare-earth magnets or ferrite magnets. The permanent magnet 2 touches a base 111 of the recess 11 at its radially inner surface 21.

The rotor 100 includes a plurality of first magnetic poles 3 and a plurality of second magnetic poles 4. The plurality of first magnetic poles 3 are disposed circumferentially spaced apart on the periphery of the rotor core 1 and include the plurality of permanent magnets 2. The plurality of first magnetic poles 3 have a first polarity provided by the permanent magnets 2. The plurality of second magnetic poles 4 are disposed circumferentially spaced apart on the periphery of the rotor core 1, each being between the permanent magnets 2 that are adjacent to one another. The plurality of second magnetic poles 4 are a plurality of salient poles having a second polarity different from the first polarity. The rotor 100 according to the first embodiment is provided with the first magnetic poles 3 that are five in number and the second magnetic poles 4 that are five in number. The first polarity of the first magnetic poles 3 and the second polarity of the second magnetic poles 4 are, for example, North polarity and South polarity, respectively. However, the first polarity and the second polarity may be reversed. The first magnetic poles 3 are evenly and angularly spaced along the circumferential direction. The second magnetic poles 4 are angularly evenly spaced along the circumferential direction.

A radially inner region 32 of each of the first magnetic poles 3 has a circumferential width expressed as an angle $\theta$im with the radial center of the rotor core 1 being the center C. The angle $\theta$im may be expressed, for example, by an angle formed: by a line A1 that connects a first corner 23 and the center C, which is the radial center of the rotor core 1; and by a line A2 that connects a second corner 25 and the center C. The first corner 23 is a first edge of the radially inner surface 21 of the permanent magnet 2 in the circumferential direction. Specifically, the first corner 23 is at an intersection of the radially inner surface 21 of the permanent magnet 2 and a first circumferential end face 22 of the permanent magnet 2. The second corner 25 is a second edge of the radially inner surface 21 of the permanent magnet 2 in the circumferential direction. Specifically, the second corner 25 is at an intersection of the radially inner surface 21 of the permanent magnet 2 and a second circumferential end face 24 of the permanent magnet 2.

A radially outer region 31 of each of the first magnetic poles 3 has a circumferential width expressed as an angle $\theta$om with the radial center of the rotor core 1 being the center C. The angle $\theta$om may be expressed, for example, by an angle formed by a line A3 that connects a third corner 26 and the center C, which is the radial center of the rotor core 1, and a line A4 that connects a fourth corner 27 and the center C. The third corner 26 is a first edge of a radially outer surface 28 of the permanent magnet 2 in the circumferential direction. Specifically, the third corner 26 is at an intersection of the radially outer surface 28 of the permanent magnet 2 and the first circumferential end face 22 of the permanent magnet 2. The fourth corner 27 is a second edge of the radially outer surface 28 of the permanent magnet 2 in the circumferential direction. Specifically, the fourth corner 27 is at an intersection of the radially outer surface 28 of the permanent magnet 2 and the second circumferential end face 24 of the permanent magnet 2.

A radially inner region 42 of each of the second magnetic poles 4 has a circumferential width expressed as an angle $\theta$is with the radial center of the rotor core 1 being the center C. The angle $\theta$is may be expressed, for example, by an angle formed: by a line B1 that connects a first corner 11a and the center C, which is the radial center of the rotor core 1; and a line B2 that connects a second corner 11b and the center C. The first corner 11a is at an intersection of the base 111 and a first circumferential end face 11c that is one of wall surfaces delimiting the recesses 11. The first corner 11a is a first edge of the radially inner region 42 of the second magnetic pole 4 in a circumferential direction. The second corner 11b is at an intersection of the base 111 and second circumferential end face 11d that is another one of the wall surfaces delimiting the recesses 11. The second corner 11b is a second edge of the radially inner region 42 of the second magnetic pole 4 in the circumferential direction.

A radially outer region 41 of each of the second magnetic poles 4 has a circumferential width expressed as an angle $\theta$os with the radial center of the rotor core 1 being the center C. The angle $\theta$os may be expressed, for example, by an angle formed: by a line B3 that connects a third corner 11e and the center C, which is the radial center of the diameter of the rotor core 1; and a line B4 that connects a fourth corner 11f and the center C. The third corner 11e is at an intersection of the first circumferential end face 11c, which is one of the wall surfaces delimiting the recess 11, and a radially outer surface 411 of the second magnetic pole 4. The third corner 11e is a first edge of the radially outer region 41 of the second magnetic pole 4 in a circumferential direction. The fourth corner 1 if is at an intersection of the second circumferential end face 11d, which is one of the wall surfaces delimiting the recesses 11, and the radially outer surface 411 of the second magnetic pole 4. The fourth corner 1 if is a second edge of the radially outer region 41 of the second magnetic pole 4 in a circumferential direction.

The rotor 100 according to the first embodiment is constructed so that $\theta$im and $\theta$is satisfy the relation $\theta im > \theta is$ while $\theta$om and $\theta$os satisfy the relation $(\theta om \times 1.1) \geq \theta os \geq (\theta om \times 0.9)$.

With $\theta$im and $\theta$is satisfying the relation $\theta im > \theta is$, the radially inner region 32 of the first magnetic pole 3 has an increased area compared to when $\theta$im and $\theta$is satisfy the relation $\theta im \leq \theta is$, so that an increased amount of magnetic flux emanates from the first magnetic pole 3. The increased amount of magnetic flux leads to increased flux linkage with a stator (not illustrated), so that improved torque density (torque/motor volume) is provided.

With θom and θos satisfying the relation (θom×1.1)≥θos≥(θom×0.9) or with θos being, for example, within ±10% of θom, reduced cogging torque results compared to when θom and θos satisfy the relation (θom×1.1)<θos or θos<(θom×0.9), that is to say, when θos is not within ±10% of θom.

Figure 2:
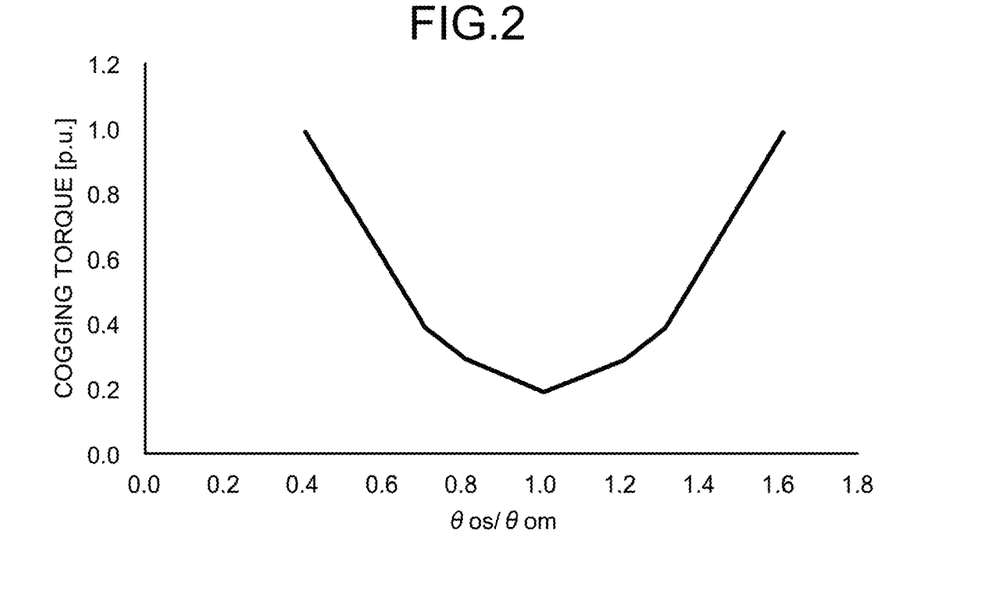
FIG. 2 illustrates a relationship between a ratio of θos to θom illustrated in FIG. 1 and cogging torque.

FIG. 2 illustrates a relationship between a ratio of θos to θom illustrated in FIG. 1 and cogging torque. A vertical axis of FIG. 2 represents the cogging torque, while a horizontal axis of FIG. 2 represents the ratio of θos to θom. If the rotor 100 constructed according to the first embodiment has θos within ±10% of θom, as illustrated in FIG. 2, the cogging torque is minimized when a value determined by θos/θom is 0.94. As described above, with θos being within ±10% of θom, there is a small difference between magnetic flux density between the stator and the radially outer region 31 of the first magnetic pole 3 and magnetic flux density between the stator and the radially outer region 41 of the second magnetic pole 4 compared to when θos is not within ±10% of θom, so that the reduced cogging torque results.

It is to be noted the rotor 100 according to the first embodiment may be constructed so that θos and θis satisfy the relation θos>θis. With this structure, the radially outer region 41 of the second magnetic pole 4 has an increased area compared to when θos and θis satisfy the relation θos≤θis, so that the magnetic flux density is suppressed from becoming saturated. Accordingly, an increased amount of magnetic flux emanates from the second magnetic pole 4. The increased amount of magnetic flux leads to increased flux linkage with the stator (not illustrated), so that improved torque density is provided.

Figure 3:
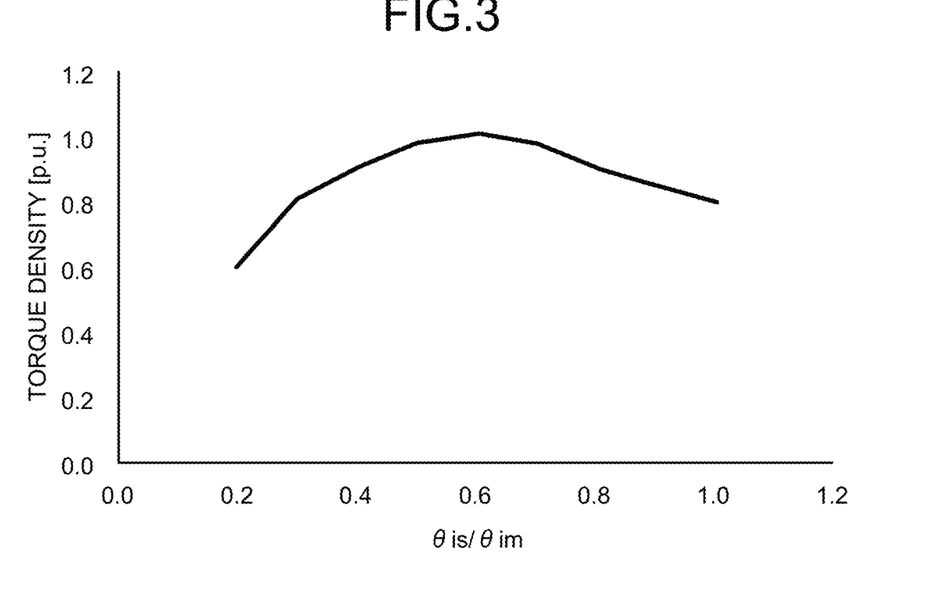
FIG. 3 illustrates a relationship between a ratio of θis to θim illustrated in FIG. 1 and torque density.

The rotor 100 according to the first embodiment may be constructed so that θim and θis satisfy the relation (θim×0.9)≥θis≥(θim×0.5). FIG. 3 illustrates a relationship between a ratio of θis to θim illustrated in FIG. 1 and torque density. A vertical axis of FIG. 3 represents the torque density, while a horizontal axis of FIG. 3 represents the ratio of θis to θim. If the rotor 100 constructed according to the first embodiment has θim and θis that satisfy the relation (θim×0.9)≥θis≥(θim×0.5), as illustrated in FIG. 3, the torque density is maximized when a value determined by θis/θim is 0.6. As described above, with θim and θis satisfying the relation(θim×0.9)≥θis≥(θim×0.5), the magnetic flux density about the second magnetic pole 4, which is the salient pole, is an appropriate value ranging, for example, from 1 T to 2 T compared to when θim and θis satisfy the relation (θim×0.9)<θis or θis<(θim×0.5), so that an increased amount of magnetic flux emanates from the radially inner surface 21 of the permanent magnet 2 and flows into the rotor core 1. Therefore, the magnetic flux that emanates from the permanent magnet 2 can be used effectively, and improved torque density is provided.

As described above, the rotor 100 constructed according to the first embodiment has θim and θis that satisfy the relation θim>θis and θom and θos that satisfy the relation (θom×1.1)≥θos≥(θom×0.9), so that increase in cogging torque can be suppressed while decrease in torque is suppressed.

Second Embodiment

Figure 4:
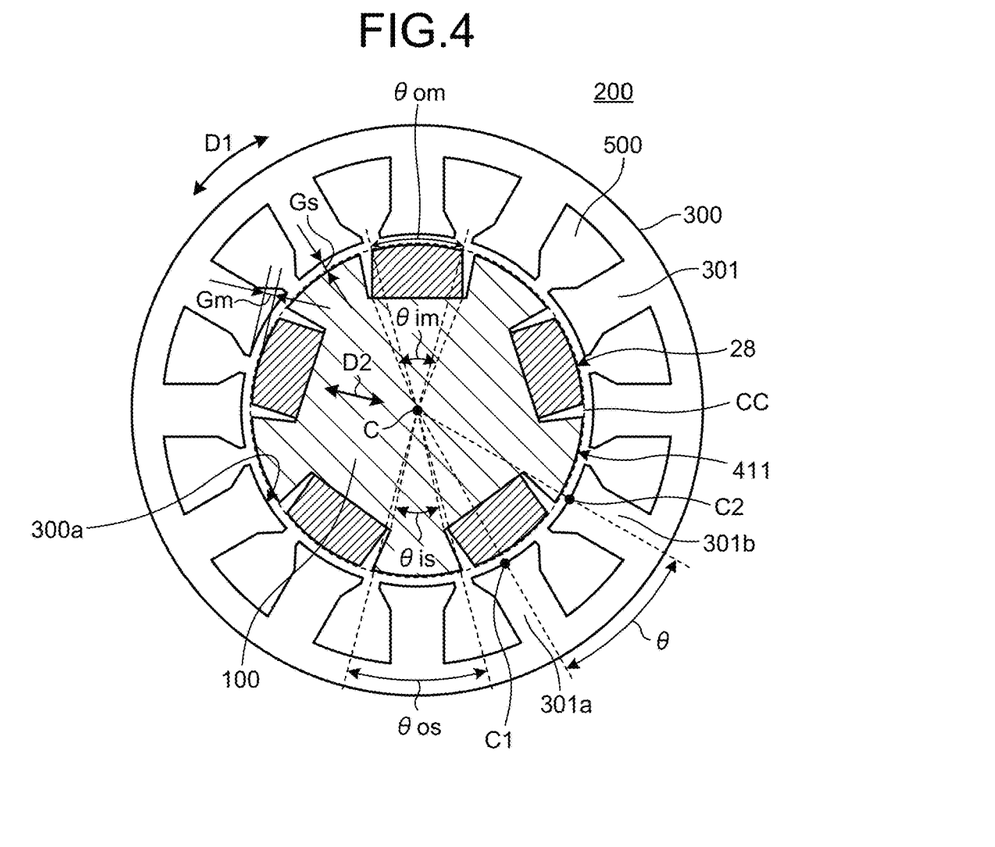
FIG. 4 is a cross-sectional view of a motor according to a second embodiment of the present invention.

FIG. 4 is a cross-sectional view of a motor according to the second embodiment of the present invention. The motor 200 according to the second embodiment includes the rotor 100 illustrated in FIG. 1 and a stator 300 that includes a plurality of teeth 301 arranged in a circumferential direction along a radially outer side of the rotor 100. With the radial center of the rotor core 1 being the center C, an angle θ is formed: by a line that connects the center C and a circumferential center C1 of a first tooth 301a, which is among the plurality of teeth 301; and by a line that connects the center C and a circumferential center C2 of a of a second tooth 301b, which among the plurality of teeth 301 is adjacent to the first tooth 301a in the circumferential direction. The motor 200 is constructed so that θom and θ satisfy the relation (θom×1.1)≥θ≥(θom×0.9).

With θom and θ satisfying the relation (θom×1.1)≥θ≥(θom×0.9), magnetic flux that emanates from the radially outer region 31 of the first magnetic pole 3 is used with improved efficiency compared to when θom and θ satisfy the relation (θom×1.1)<θ or θ<(θom×0.9), so that improved torque density is provided.

Figure 5:
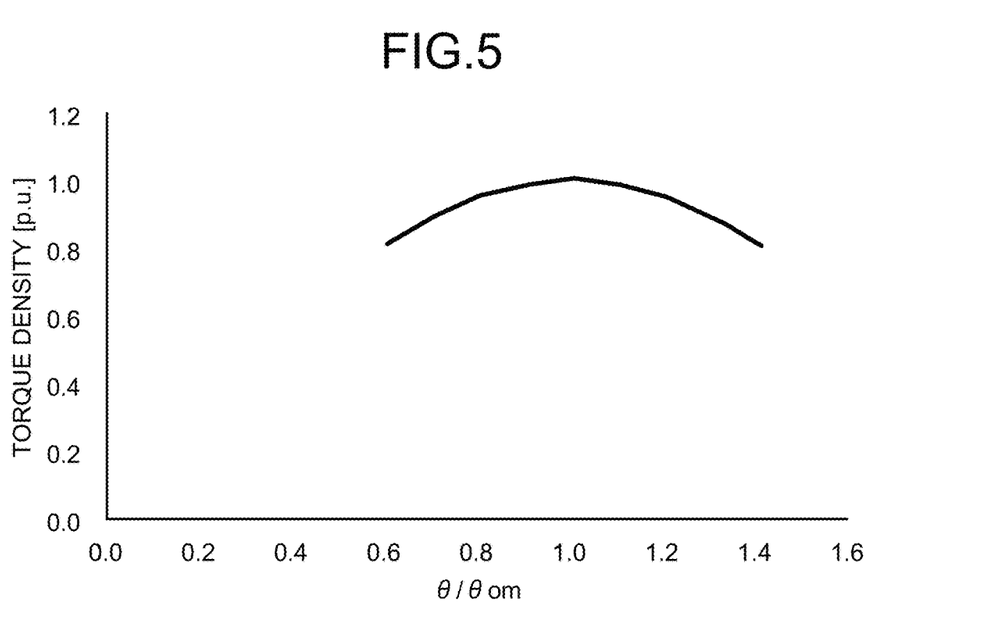
FIG. 5 illustrates a relationship between a ratio of θ to θom illustrated in FIG. 4 and torque density.

FIG. 5 illustrates a relationship between a ratio of θ to θom illustrated in FIG. 4 and torque density. A vertical axis of FIG. 5 represents the torque density, while a horizontal axis of FIG. 5 represents the ratio of θ to θom. As illustrated in FIG. 5, the torque density is maximized when a value determined by θ/θom of the motor 200 according to the second embodiment is 1.0.

It is to be noted that the motor 200 according to the second embodiment may be constructed so that a radially outer surface of the first magnetic pole 3 and the radially outer surface 411 of the second magnetic pole 4 are provided on concentric circles CC each having a radial center as the center C. The radially outer surface of the first magnetic pole 3 corresponds to the radially outer surface 28 of the permanent magnet 2. For example, a clearance formed between the radially outer surface of the first magnetic pole 3 and a radially inner surface 300a of the stator 300 has a width Gm, and a clearance formed between the radially outer surface 411 of the second magnetic pole 4 and the radially inner surface 300a of the stator 300 has a width Gs. The motor 200 is constructed to have Gm and Gs that are equal. The radially inner surface 300a of the stator 300 corresponds to a leading end face of each of the teeth 301. With this structure that allows both Gm and Gs to be decreased, magnetic flux per unit area of each of Gm and Gs increases compared to when Gm is not equal to Gs, so that the torque density is increased even more.

Figure 6:
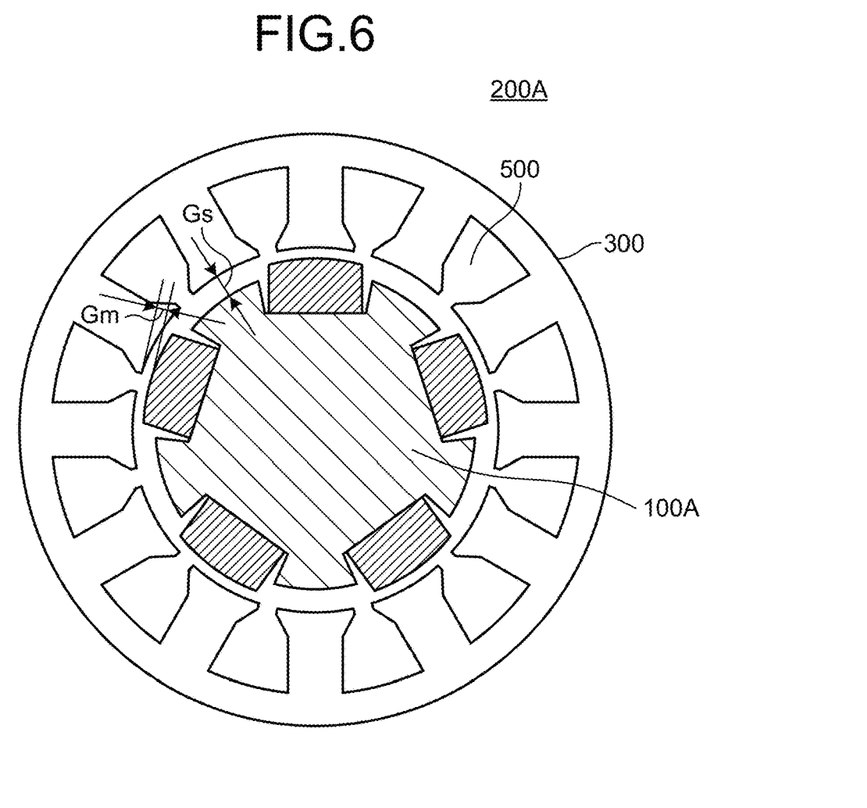
FIG. 6 illustrates a variation of the motor illustrated in FIG. 4.

FIG. 6 illustrates a variation of the motor illustrated in FIG. 4. The motor 200A illustrated in FIG. 6 includes a rotor 100A in place of the rotor 100 illustrated in FIG. 4. The rotor 100A is constructed so that Gm and Gs satisfy the relation Gs>Gm. With this structure, a magnetic reluctance between the first magnetic pole 3 and a tooth is lower than a magnetic reluctance between the second magnetic pole 4 and a tooth compared to when Gm and Gs satisfy the relation Gs≤Gm, so that a fundamental component of magnetic flux that emanates from the first magnetic pole 3 and forms linkage with the tooth via Gm increases. Accordingly, a relatively decreased harmonic component is superimposed on the fundamental component of the magnetic flux, and electromagnetic excitation force is decreased.

Figure 7:
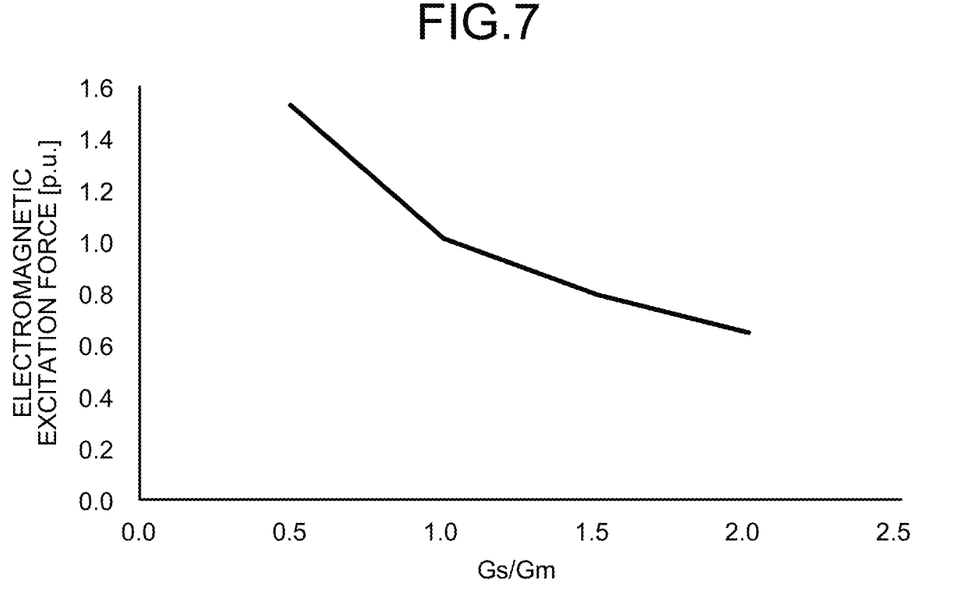
FIG. 7 illustrates a relationship between a ratio of Gs to Gm illustrated in FIG. 6 and electromagnetic excitation force.

FIG. 7 illustrates a relationship between a ratio of Gs to Gm illustrated in FIG. 6 and the electromagnetic excitation force. A vertical axis of FIG. 7 represents the electromagnetic excitation force, while a horizontal axis of FIG. 7 represents the ratio of Gs to Gm. As illustrated in FIG. 7, the electromagnetic excitation force decreases as a value that is determined by Gs/Gm of the motor 200A increases with a constant sum of Gs and Gm being maintained.

Figure 8:
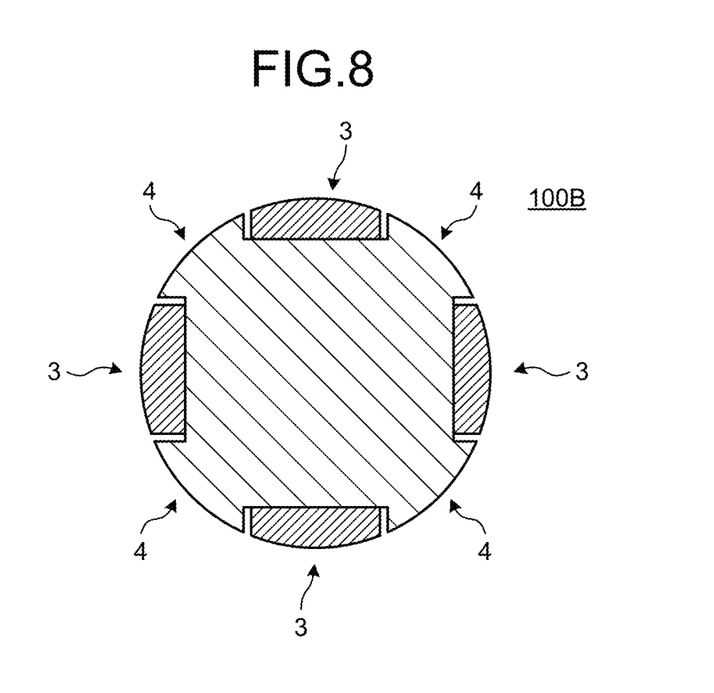
FIG. 8 illustrates an example in which the rotor according to each of the first and second embodiments of the present invention is provided with eight magnetic poles.

It is to be noted that those permanent magnets of the rotor according to each of the first and second embodiments are not limited to five in number. FIG. 8 illustrates an example in which the rotor according to each of the first and second embodiments of the present invention is provided with eight magnetic poles. A rotor 100B illustrated in FIG. 8 includes the first magnetic poles 3 that are four in number and the second magnetic poles 4 that are four salient poles. The total number of magnetic poles of the rotor 100B is thus eight. A current that flows through a winding (not illustrated) when the rotor 100B is rotated at high speed has a lower alternating frequency than a current that flows through the winding (not illustrated) when the rotor 100B is rotated at low or medium speed. When the alternating frequency becomes lower, terminal voltage decreases, and a core loss that is caused in a rotor core becomes lower. By having the above structure, the rotor 100B can suppress the terminal voltage and the iron loss when rotated at high speed. The terminal voltage is what is applied to the stator winding (not illustrated).

Figure 9:
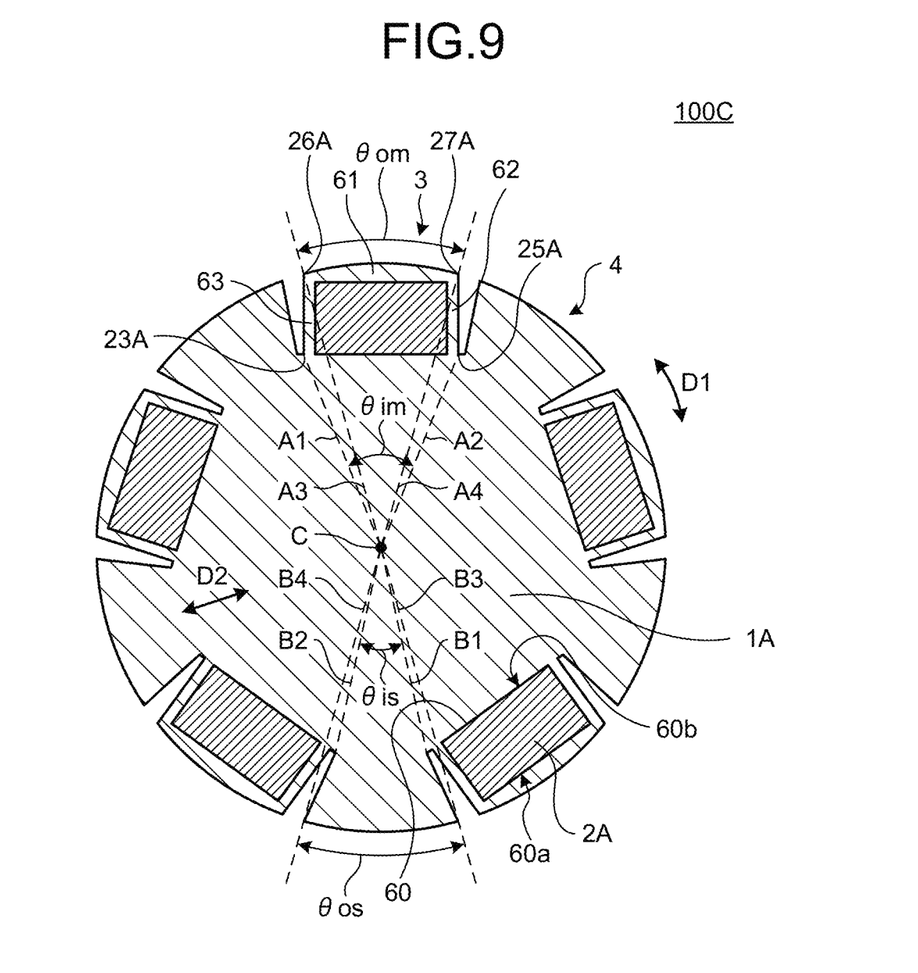
FIG. 9 illustrates a variation of the rotor according to each of the first and second embodiments of the present invention.

The rotor shown in each of the first and second embodiments is not limited to a surface magnet rotor that is provided with permanent magnets on an outer peripheral surface of a rotor core and may be an interior magnet rotor that has permanent magnets inserted in a rotor core. FIG. 9 illustrates a variation of the rotor according to each of the first and second embodiments of the present invention. The rotor 100C illustrated in FIG. 9 is an interior magnet rotor. The rotor 100C includes the first magnetic poles 3 that are five in number and the second magnetic poles 4 that are five salient poles. A rotor core 1A of the rotor 100C includes a plurality of magnet insertion holes 60. The plurality of magnet insertion holes 60 are arranged in spaced relation to one another along a circumferential direction of the rotor core 1A. The rotor core 1A also includes permanent magnets 2A in place of the permanent magnets 2. The permanent magnets 2A are inserted into the plurality of magnet insertion holes 60, respectively. The rotor core 1A includes a bridge 61, a bridge 62, and a bridge 63 that define the magnet insertion hole 60. The bridge 61 is provided along a radially outer side of the permanent magnet 2A. The bridge 62 is provided along a first end of the permanent magnet 2A in a circumferential direction. The bridge 63 is provided along a second end of the permanent magnet 2A in a circumferential direction. The bridge 61, the bridge 62, and the bridge 63 form a magnetic path along which magnetic flux that emanates from the permanent magnet 2A flows, so that each of the first magnetic poles 3 includes the permanent magnet 2A, the bridge 61, the bridge 62, and the bridge 63. In the rotor 100C, an angle θim is formed, for example, by: the line A1 that connects a first corner 23A and the center C, which is a radial center of the rotor core 1A; and the line A2 that connects a second corner 25A and the center C. The first corner 23A is a radially inner edge of the bridge 63. The second corner 25A is a radially inner edge of the bridge 62. The θom is an angle formed, for example, by the line A3 that connects a third corner 26A and the center C, which is the radial center of the rotor core 1A; and by the line A4 that connects a fourth corner 27A and the center C. The third corner 26A is a radially outer edge of the bridge 63.

The fourth corner 27A is a radially outer edge of the bridge 62. The angle θis of the rotor 100C corresponds to the angle θis illustrated in FIG. 1, and the angle θos of the rotor 100C corresponds to the angle θos illustrated in FIG. 1.

The permanent magnet 2A is a plate-shaped magnet having a radially outer surface 60a and a radially inner surface 60b that are flat. Since the permanent magnet 2A can be inserted into the magnet insertion hole 60, without having to have the permanent magnet 2A's radially outer and inner surfaces 60a and 60b curved like those of the permanent magnet 2 illustrated in FIG. 4, the rotor core 1A can be constructed so that those above-mentioned Gm and Gs satisfy the relation Gs=Gm or Gs>Gm by having a radially outer surface of the bridge 61 curved. Therefore, compared to when the radially outer surface 60a and the radially inner surface 60b of the permanent magnet 2A are curved, the permanent magnet 2A of the rotor 100C is simplified in structure. Moreover, because the radially outer surface 60a of the permanent magnet 2A can have the same shape as the radially inner surface 60b of the permanent magnet 2A, the permanent magnet 2A is suppressed from being misassembled when inserted into the magnet insertion hole 60, thus allowing the rotor 100C to be manufactured in a reduced time. Since the rotor 100C can be manufactured in the reduced time, manufacturing costs of the rotor 100C can be reduced. It is to be noted that the rotor 100C may be combined with the stator 300, replacing the rotor 100 illustrated in FIG. 4 or the rotor 100A illustrated in FIG. 6.

It is also to be noted that each of the motors 200 and 200A according to the present embodiment may be constructed to have a magnetic pole count P and a slot count Q that satisfy the relation $0.9 \geq (P/Q)$ or $1.1 \leq (P/Q)$. The magnetic pole count P is a number of magnetic poles that equals the plurality of first magnetic poles plus the plurality of second magnetic poles. The slot count Q is a number of slots 500 formed in the stator 300. The plurality of slots 500 are arranged in spaced relation to one another along a circumferential direction of the stator 300. Each of the plurality of slots 500 extends along an axis of the stator 300 between a first end face of the stator 300 and a second end face of the stator 300. The axis corresponds with a direction that is orthogonal to the diameter of the rotor core 1 illustrated, for example, in FIG. 1. A ratio of the magnetic pole count P to the slot count Q is P/Q. Specifically, each of the motors 200 and 200A is, for example, a 2N-pole 3N-slot motor, a 4N-pole 3N-slot motor, a 10N-pole 12N-slot motor, a 14N-pole 12N-slot motor, an 8N-pole 9N-slot motor, or a 10N-pole 9N-slot motor. N is an integer greater than or equal to one. Even when each of the motors 200 and 200A is constructed in this way, as in the case where each of the motors 200 and 200A is constructed to have θim and θis that satisfy the relation θim>θis and θom and θos that satisfy the relation $(θom \times 1.1) \leq θos \leq (θom \times 0.9)$, increase in cogging torque can be suppressed while decrease in torque is suppressed.

The above structures illustrated in the embodiments are illustrative of contents of the present invention, can be combined with other techniques that are publicly known and can be partly omitted or changed without departing from the gist of the present invention.

REFERENCE SIGNS LIST 1, 1A rotor core; 2, 2A permanent magnet; 3 first magnetic pole; 4 second magnetic pole; 11 recesses; 11a, 23, 23A first corner; 11b, 25, 25A second corner; 11c first circumferential end face; 11d second circumferential end face; 11e, 26, 26A third corner; 11f, 27, 27A fourth corner; 21, 60b, 300a radially inner surface; 22 first end face in a circumferential direction; 24 second end face in a circumferential direction; 28, 60a, 411 radially outer surface; 31, 32, 41, 42 region; 60 magnet insertion hole; 61, 62, 63 bridge; 100, 100A, 100B, 100C rotor; 111 base; 200, 200A motor; 300 stator; 301 tooth; 301a first tooth; 301b second tooth; 500 slot.

The invention claimed is:

1. A rotor comprising:
a rotor core;
first magnetic poles disposed on the rotor core in spaced relation to one another in a circumferential direction along a periphery of the rotor core, each of the first magnetic poles including a permanent magnet and having a first polarity provided by the permanent magnets; and
second magnetic poles formed in a circumferential direction spaced apart along the periphery in the rotor core, each of the second magnetic poles being between the permanent magnets that are adjacent to one another, the second magnetic poles being salient poles having a polarity different from the first polarity, wherein
a radial center of the rotor core is a center,
a line connecting the center and a first edge of a radially outer side of each of the permanent magnets and a line connecting the center and a second edge of the radially outer side of each of the permanent magnets form an angle θom,
a line connecting the center and a first edge of a radially inner side of each of the permanent magnets and a line connecting the center and a second edge of the radially inner side of each of the permanent magnets form an angle θim,
a line connecting the center and a first edge of a radially outer side of each of the salient poles and a line connecting the center and a second edge of the radially outer side of each of the salient poles form an angle θos,
a line connecting the center and a first edge of a radially inner side of each of the salient poles and a line connecting the center and second edge of the radially inner side of each of the salient poles form an angle θis,
the angle θim and the angle θis satisfy the relation θim>θis, and
the angle θom and the angle θos satisfy the relation (θom×1.1)≥θos≥(θom×0.9) that includes a value in which cogging torque is minimized.

2. The rotor according to claim 1, wherein the angle θos and the angle θis satisfy the relation θos≥θis.

3. The rotor according to claim 1, wherein the angle θim and the angle θis satisfy the relation (θim×0.9)≥θis≥(θim×0.5).

4. The rotor according to claim 1, wherein
the rotor core includes a plurality of magnet insertion holes arranged in spaced relation to one another in a circumferential direction, and
each of the permanent magnets is inserted into each of the magnet insertion holes and is plate-shaped magnet having a radially outer surface and a radially inner surface that are flat.

5. A motor comprising:
the rotor according to claim 1; and
a stator including a plurality of teeth arranged in a circumferential direction along a radially outer side of the rotor, wherein
an angle θ is formed by a line connecting the center and a circumferential center of a first tooth that is among the plurality of teeth, and a line connecting the center and a circumferential center of a second tooth that is among the plurality of teeth is adjacent to the first tooth in the circumferential direction, and
the angle θom and the angle θ satisfy the relation (θom×1.1)≥θ≥(θom×0.9) that includes a value in which torque density is maximized.

6. The motor according to claim 5, wherein
a clearance formed between a radially outer surface of each of the permanent magnets and a radially inner surface of the stator has a width Gm,
a clearance formed between a radially outer surface of each of the salient poles and a radially inner surface of the stator has a width Gs, and
the width Gm and the width Gs satisfy the relation Gs>Gm.

7. The motor according to claim 5, wherein a radially outer surface of each of the permanent magnets and a radially outer surface of each of the salient poles are provided on concentric circles each having the center as an origin.

8. The motor according to claim 5, wherein
the plurality of permanent magnets plus the salient poles equals a magnetic pole count P,
a number of slots formed in the stator is a slot count Q, and
the magnetic pole count P and the slot count Q satisfy one of the relations 0.9≥(P/Q) and 1.1≤(P/Q).

* * * * *